United States Patent [19]

Matsumoto et al.

[11] Patent Number: 5,458,966
[45] Date of Patent: Oct. 17, 1995

[54] RESINOUS CONSTRUCTION MATERIAL HAVING FIRE-RESISTANT INTUMESCENT CAP LAYER

[75] Inventors: Dean S. Matsumoto, Niskayuna; David G. Hawron, Clifton Park; Margaret L. Blohm, Schenectady, all of N.Y.

[73] Assignee: General Electric Company, Schenectady, N.Y.

[21] Appl. No.: 242,892

[22] Filed: May 16, 1994

[51] Int. Cl.$^6$ .............................. B32B 27/08; B32B 27/36
[52] U.S. Cl. ..................... 428/339; 428/332; 428/411.1; 428/412; 428/447; 428/473.5; 428/920; 428/921
[58] Field of Search ...................... 428/332, 339, 428/411.1, 412, 447, 473.5, 920, 921

[56] References Cited

U.S. PATENT DOCUMENTS

| | | | |
|---|---|---|---|
| 4,661,577 | 4/1987 | Lane et al. | 528/10 |
| 4,937,031 | 6/1990 | Curry | 264/171 |
| 4,981,894 | 1/1991 | Nye et al. | 524/401 |
| 5,169,887 | 12/1992 | Snow et al. | 524/267 |
| 5,175,198 | 12/1992 | Minnick et al. | 523/222 |
| 5,204,438 | 4/1993 | Snow et al. | 528/25 |

FOREIGN PATENT DOCUMENTS 1272334  10/1984  Canada.

*Primary Examiner*—D. S. Nakarani
*Attorney, Agent, or Firm*—William H. Pittman

[57] ABSTRACT

Thermoplastic resin sheets, particularly in the form of fiber-reinforced composites, have adherent cap layers, at least one of which comprises an intumescent polydiorganosiloxane-containing barrier material which forms upon ignition a thermally stable foamed char layer. Such articles have improved fire resistance in comparison with similar articles having no cap layer or non-intumescent cap layers.

11 Claims, No Drawings

RESINOUS CONSTRUCTION MATERIAL HAVING FIRE-RESISTANT INTUMESCENT CAP LAYER

BACKGROUND OF THE INVENTION

This invention relates to the production of fire resistant structures, and more particularly to the production of such structures incorporating thermoplastic resins.

The use of thermoplastic resins in sheet form in construction (e.g., roofing) materials for buildings and vehicles of transport, especially ships, is of increasing interest by reason of the relatively light weight of such resins as compared with other materials used for the same purpose. Resinous construction materials generally are fiber-reinforced, as with glass mats.

A principal requirement of construction and maritime materials is fire retardancy. This has several aspects.

Fire propagation tendency is the tendency of the material to support combustion; i.e., to ignite. A test method for this property is ASTM procedure E1354 (oxygen consumption calorimeter test).

Fire retardancy is the tendency of the material to resist flame spreading. It can be evaluated by ASTM method E162.

Fire containment is the tendency of the material to serve as a fire barrier. Various heat release methods can be used for its evaluation.

Smoke and toxicity characteristics are related to the potential of escape from a burning area and for successful fire fighting. Smoke obscuration can be measured by ASTM method E662.

Fire endurance is the tendency of a material to maintain its structural integrity after a fire.

Fire containment in turn has several related parameters. They include flame spread, inherent flammability and heat conduction. If the material conducts enough heat to an adjacent space, ignition can occur. Thus, good fire containment is important for survivability. Containment can often be improved by reducing the thermal conductivity of the material.

A common approach to fire containment in the case of a thermoplastic is the use of a barrier layer, typically a ceramic, intumescent or ablative coating. A barrier layer can improve fire retardancy by reflecting the radiant heat back toward the source, by delaying heat penetration or by physically shielding the thermoplastic from the heat or flame source. As a result, the temperatures generated during burning are reduced, prolonging the survival of the thermoplastic resin and thereby improving its retention of mechanical properties.

Many types of previously known barrier coatings have serious disadvantages. For example, a ceramic coating of sufficient thickness to serve the purpose adds significant weight to the composite, rendering it unsuitable for nautical and many other applications. Intumescent paints, on the other hand, tend to adhere poorly to thermoplastic surfaces.

Accordingly, there is a need for improved barrier coatings to be used with thermoplastic building and construction materials, especially composites. A class of such improved coatings constitutes the present invention.

SUMMARY OF INVENTION

In one of its aspects, the invention is an article of manufacture comprising a sheet of thermoplastic resin with an adherent cap layer having a thickness of at least about 800 microns on the entire surface of each side thereof. At least one cap layer comprises an intumescent polydiorganosiloxane-containing barrier material which forms upon ignition a thermally stable foamed char layer.

Another aspect of the invention is a method for producing an article of manufacture which comprises heat sealing a sheet of thermoplastic resin between two cap layers as defined above.

DETAILED DESCRIPTION; PREFERRED EMBODIMENTS

The sheet resin employed according to this invention may be any known thermoplastic resin. Engineering thermoplastics such as polycarbonates, polyphenylene ethers and linear polyesters are often preferred because of their high performance capability, and any known species of engineering thermoplastic may be employed. Preferred resins are polycarbonates and polyphenylene ethers, with bisphenol A polycarbonate and poly(2,6-dimethyl-1,4-phenylene ether) being especially preferred.

The sheet of thermoplastic resin is preferably in the form of a fiber-reinforced composite. Any suitable reinforcing fiber may be present therein, with nonflammable fibers such as glass, carbon and boron fibers being preferred. The proportion of fibers is not critical and is generally about 20–60% by weight of total composite. The composite is most often in the form of a resin-impregnated fiber mat, although the use of randomly distributed long or short fibers is also within the scope of the invention.

Both planar and non-planar sheets are suitable, with planar sheets generally being preferred in construction applications. The thickness of the sheet resin is not critical, a typical thickness being in the range of about 1.5–3 mm.

An essential feature of the invention is the presence of an adherent cap layer having a thickness of at least about 800 microns, preferably about 1000–2000 microns, on each side of the sheet resin. A cap layer on each side is required to maintain structural stability; e.g., to prevent warping.

It is not always necessary for the two cap layers to be identical. Thus, if only one side of the structure in use will be exposed to flame or ignition temperatures, only the cap layer on that side needs to be of the intumescent barrier material. In many instances, however, it is preferred to employ two identical cap layers.

At least one of the cap layers is capable of forming upon burning a thermally stable foamed layer of char. The term "thermally stable", as used herein, means that the amount of char remaining (by weight) after 10 minutes of exposure to a heat flux of 40 kW/m² is at least 30% of the char initially produced by ignition of the intumescent layer.

Said char-forming cap layer comprises an intumescent polydiorganosiloxane. By "intumescent" is meant a layer which swells, typically by foaming, upon heating with exposure to flame. By "polydiorganosiloxane" is meant a polymer comprising structural units of the formula

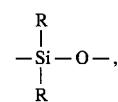

wherein each R is an organic radical and preferably an aliphatic radical. The most preferred polydiorganosiloxanes (hereinafter sometimes designated "silicones" for brevity) are the polydimethylsiloxanes.

It is generally preferred for the intumescent cap layer to contain other units in addition to polydiorganosiloxane units. Said other units may be in the form of a copolymer, an additional polymer constituent in a blend or both. In general, the polydiorganosiloxane units should comprise enough of the material to render it intumescent. Depending on the circumstances, this may be from about 1.5% by weight upward, but proportions greater than about 50% are usually not required and are therefore not preferred. Also present in minor proportions may be conventional materials such as plasticizers and inorganic flame retardant additives.

The following are illustrative of types of silicone-containing compositions useful as the intumescent cap layer, with types I and II being preferred by reason of their excellent performance:

I. Silicone polyetherimides. They may be prepared, for example, by the reaction of at least one aromatic diamine with a mixture of dianhydrides including a bis-dianhydride-terminated silicone, or by the reaction of a mixture of diamines including a bis-diamine-terminated silicone with aromatic dianhydrides. Alternatively, a mixture of m- and p-phenylenediamines reacts with a phthalic anhydride-terminated silicone to produce a silicone diamine-terminated intermediate which then undergoes reaction with 2,2-bis[4-(3,4-dicarboxyphenoxy)phenyl]propane dianhydride (hereinafter "BPADA"). Such silicone polyetherimides are disclosed, for example, in U.S. Pat. No. 4,981,894.

II. Polyphenylene ethers containing silicones as flame retardant additives, generally in the amount of about 2–5 parts per 100 parts of said polyphenylene ether. Examples are blends of polyphenylene ether with a mixture of a silicone-equilibrated methyltrimethoxysilane and a silicone-equilibrated 3-(2-aminoethylamino)propyltrimethoxysilane. Silicone-equilibrated 3-(2-aminoethylamino)propyltrimethoxysilane and silicone oil blends therewith are disclosed in U.S. Pat. No. 4,661,577 and Canadian Patent 1,272,334.

III. Polycarbonate-silicone block copolymers; for example, bisphenol A polycarbonate-polydimethylsiloxane block copolymers.

Other silicone materials, such as those described in U.S. Pat. No. 5,169,887, may also be employed as cap layers.

According to the method of this invention, the article having the desired cap layers is produced by heat treating a sheet of thermoplastic resin, preferably in the form of a fiber-reinforced composite, between two cap layers. An illustrative heat treatment process is compression molding, which may, for example, be achieved by passing a continuous glass fiber mat and the thermoplastic resin between heated molds, applying the cap layers and then introducing the assembly into a mold. Typical heat treatment temperatures are in the range of about 200°–250° C.

As will be apparent from the above description, the method of this invention does not involve the use of solvent-containing materials. Thus, it is distinguishable from methods employing intumescent paints.

The improved fire resistance afforded by the present invention may be the result of one or more factors, the relative contributions of which it is not presently possible to determine. Among them may be the ability of the intumescent coating and the char formed therefrom to serve as a thermal insulator and as an oxygen and fuel blocker.

The invention is illustrated by the following examples.

EXAMPLES 1–3

The apparatus used to measure the fire resistance of the articles of this invention included a stainless steel frame in which was mounted a horizontal wire mesh screen adequate to support a 178×102 mm. square of the article being tested. The frame had a 6.4-mm. lip around its perimeter to shield the edges of the test sample. The test samples were placed in this holder and exposed to a small flame ignition source under a radiant heater providing a radiant flux of 40 kW/m². Thermocouples were placed directly under the sample ("underside") and at a deck surface ("deck") at a distance from the lower side of the sample. The underside and deck temperatures were recorded at various times; the maximum temperature reached during the 30-minute test was also recorded. The observed temperatures can be correlated with the barrier performance of the cap layers, with lower underside and deck temperatures being indicative of improved fire resistance.

The cap layer materials tested were as follows.

Composition A: A blend including a silicone polyimide prepared by first reacting a mixture of m- and p-phenylenediamines with a phthalic anhydride-terminated silicone having a degree of polymerization of about 10 in a molar ratio of about 3:1 to produce a silicone diamine terminated intermediate, and reacting said intermediate with BPADA, the molar ratios of said non-silicone-containing and silicone-containing dianhydrides being about 2:1. The other constituents of the blend were 4 phr. (parts by weight per 100 parts of resin) of tetrabenzoyl-pentaerythritol as a plasticizer and 3.5 phr. of crystallized zinc borate as an inorganic flame retardant. The total silicone proportion was about 43% by weight.

Composition B: A blend of poly(2,6-dimethyl-1,4-phenylene ether) with 5 phr. of a mixture of a silicone-equilibrated methyltrimethoxysilane and a silicone-equilibrated 3-(2-aminoethylamino)propyltrimethoxysilane in a weight ratio of 3:1, the degrees of polymerization of the silicone blocks in both silicone constituents being about 13. The total silicone proportion was about 4.3% by weight.

Composition C: A bisphenol A polycarbonate-polydimethylsiloxane block copolymer containing 42% by weight polydimethylsiloxane groups having a degree of polymerization of about 10.

Resinous composites having a thickness of 2400 microns, containing 60% (by weight) bisphenol A polycarbonate and 40% glass fibers in the form of a mat, were prepared, cut to size, dried and placed in a matched die tool between two identical cap layers. The tool was shimmed to provide cap layers of the desired thickness and compression molded at 204° C. The molded samples were tested for flammability as described hereinabove.

The results are given in Table I in comparison with four controls, one employing no cap layers and the other three employing non-intumescent cap layers. The polyetherimide employed in Control 4 was the reaction product of m-phenylenediamine and BPADA.

TABLE I

| Example | Copolymer Identity | Thickness mm. | Underside temp., °C. 5 min. | 10 min. | Max. | Deck temp., °C. 5 min. | 10 min. | Max. | % char. Flame out | 10 min. |
|---|---|---|---|---|---|---|---|---|---|---|
| 1 | Comp. A | 1.65 | 200 | 240 | 275 | 120 | 170 | 220 | 75 | 58 |
| 2 | Comp. B | 1.65 | 180 | 360 | 430 | 125 | 220 | 400 | 33 | 14 |
| 3 | Comp. C | 1.78 | 220 | 330 | 600 | 130 | 250 | 525 | 16 | 5 |
| Control 1 | None | — | 530 | 640 | 640 | 370 | 540 | 590 | — | — |
| Control 2 | Polycarbonate | 1.65 | 240 | 400 | 600 | 160 | 330 | 575 | 20 | 0 |
| Control 3 | Polypropylene | 1.65 | 320 | 460 | 570 | 210 | 370 | 560 | — | — |
| Control 4 | Polyetherimide | 1.65 | 220 | 380 | 575 | 140 | 300 | 500 | 55 | 14 |

It will be apparent from the results in Table I that Composition A serves as an excellent barrier, shielding the thermoplastic resin composite and forming a high proportion of char with excellent survival during the test (77% of the original weight remaining after 10 minutes). Composition B was also highly effective, with relatively low deck and underside temperatures and 42% of the original char weight remaining. Composition C was substantially less effective than compositions A and B, but still showed an improvement over most of the controls, with 31% of original char weight remaining as opposed to 25% for Control 4.

EXAMPLE 4

Resinous composites with intumescent cap layers, identical to the composite of Example 1, were evaluated for fire propagation tendency by ASTM procedure E1354. In one series of tests, an apparatus including a frame and top grid was employed; in the other, no frame or grid was present. Comparisons were made with two controls: Control 5 in which a composite layer 3050 microns thick and having no cap layer was employed, and Control 6 in which non-intumescent polycarbonate cap layers were employed. The results are given in Table II.

TABLE II

| Sample | Frame/grid | Ignition time, sec. | Total heat, MJ/m$^2$ | Peak heat release rate, MJ/min. − m.$^2$ | Mass loss, % | Specific extinction, m.$^2$/kg. |
|---|---|---|---|---|---|---|
| Ex. 4* | Yes | 582 | 26 | 60 | 24 | 162 |
| Control 6* | Yes | 147 | 107 | 370 | 73 | 903 |
| Ex. 4 | No | 45 | 60 | 132 | 33 | — |
| Control 5 | No | 175 | 64 | 960 | 93 | 850 |
| Control 6 | No | 109 | 118 | 544 | 83 | 740 |

*Average of 2 samples.

It is apparent from the results in Table II that the article of this invention, when employed with a frame and grid, was substantially superior to the control in that ignition time was much greater, total and peak heat release and mass loss were much lower, and the amount of smoke generated as measured by specific extinction was also lower. The same was true when no frame was employed, except that ignition time was short for the article of the invention. This is believed to be a result of the ease of ignition of an edge of the sample.

What is claimed is:

1. An article of manufacture comprising a sheet of a thermoplastic fiber-reinforced resin composite with an adherent cap layer having a thickness of at least about 800 microns on the entire surface of each side thereof, at least one cap layer comprising an intumescent polydiorganosiloxane-containing barrier material which forms upon ignition a thermally stable foamed char layer.

2. An article according to claim 1 wherein the fibers are non-flammable.

3. An article according to claim 2 wherein the fibers are glass fibers.

4. An article according to claim 1 wherein both cap layers are intumescent.

5. An article according to claim 4 wherein the thickness of the cap layers is about 1000–2000 microns.

6. An article according to claim 1 wherein the polydiorganosiloxane is a polydimethylsiloxane.

7. An article according to claim 6 wherein the cap layer comprises a polydiorganosiloxane polyetherimide, a polyphenylene ether containing a polydiorganosiloxane as a flame retardant additive or a polycarbonate-polydiorganosiloxane block copolymer.

8. An article according to claim 7 wherein the cap layer is a polydiorganosiloxane polyetherimide which is the reaction product of at last one aromatic diamine with a mixture of dianhydrides comprising a bis-dianhydride-terminated polydimethylsiloxane.

9. An article according to claim 8 wherein the cap layer is a polydiorganosiloxane polyetherimide formed by the reaction of a mixture of m- and p-phenylenediamines with a phthalic anhydride-terminated polydimethylsiloxane to produce a polydimethylsiloxane diamine-terminated intermediate which then undergoes reaction with 2,2-bis[4-(3,4-dicarboxyphenoxy)phenyl]propane dianhydride.

10. An article according to claim 1 wherein the thermoplastic resin is a polycarbonate or a polyphenylene ether.

11. An article according to claim 10 wherein the thermoplastic resin is a bisphenol A polycarbonate.

* * * * *